(12) United States Patent
George et al.

(10) Patent No.: US 7,490,755 B2
(45) Date of Patent: Feb. 17, 2009

(54) METHOD AND PROGRAM FOR ESTABLISHING PEER-TO-PEER KARMA AND TRUST

(75) Inventors: David A. George, Somers, NY (US); Raymond B. Jennings, III, Ossining, NY (US); Martin G. Kienzle, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 11/331,712

(22) Filed: Jan. 13, 2006

(65) Prior Publication Data

US 2007/0168298 A1     Jul. 19, 2007

(51) Int. Cl.
*G06F 17/00* (2006.01)
(52) U.S. Cl. ........................................ 235/375; 709/205
(58) Field of Classification Search ................. 235/375; 709/202, 204, 225, 205
See application file for complete search history.

(56) References Cited

U.S. PATENT DOCUMENTS 7,203,753 B2 * 4/2007 Yeager et al. ............... 709/225
7,213,047 B2 * 5/2007 Yeager et al. ............... 709/202
2003/0055898 A1 * 3/2003 Yeager et al. ............... 709/205
2005/0086300 A1 * 4/2005 Yeager et al. ............... 709/204

OTHER PUBLICATIONS

Ebay, Inc., Feedback, http://pages.ebay.com/services/forum/feedback.html, (copy comprises 2 unnumbered pages), downloaded Apr. 4, 2006.
Amazon.com, Inc, Amazon.com Help: Fulfillment, Getting Paid and Feedback/Feedback, http://amazon.com/exec/obidos/tg/browse/-/1161258/002-7755440-2847236, (copy comprises 2 unnumbered pages), downloaded Apr. 4, 2006.

* cited by examiner

Primary Examiner—Daniel A Hess

(57) ABSTRACT

One embodiment of the present method and program for establishing peer-to-peer karma and trust by a first user in a network includes engaging in a transaction with at least a second user in the network, where the engaging includes: sending to the second user an initial transaction envelope including a first set of transaction details, wherein the initial transaction envelope is signed using a private key for the first user, receiving from the second user an appended transaction envelope, the appended transaction envelope including the first set of transaction details and a second set of transaction details, and executing the transaction in accordance with the appended transaction envelope. Feedback is exchanged with the second network user regarding the transaction, where a copy of the feedback is maintained locally by at least one of the first user and the second user.

8 Claims, 5 Drawing Sheets

METHOD AND PROGRAM FOR ESTABLISHING PEER-TO-PEER KARMA AND TRUST

FIELD OF THE INVENTION

The present invention relates generally to computing networks and relates more particularly to establishing trust or karma between users of peer-to-peer data transfer networks.

BACKGROUND

FIG. 1 is a schematic diagram of a network 100 of nodes (e.g., computing devices) interacting in a peer-to-peer (P2P) manner. Generally, a requesting node 101 sends a search message 105 (e.g., containing keywords relating to data that the requesting node 101 wishes to locate) to at least one intermediate node 111 in communication with the requesting node 101 via a peer connection. The intermediate node 111 receives the search message 105 and forwards the search message 105 to at least one additional node 111. Eventually, the search message 105 reaches at least one responding node 103 having the requested data (in some cases, the first intermediate node 111 to which the search message 105 is forwarded will also be a responding node 103). At least one responding node 103 then sends a response message 107 back to the requesting node 101, e.g., via the intermediate nodes 111. The requesting node 101 then requests the relevant data from a responding node 103 by connecting directly to the responding node 103, e.g., via direct connection 109.

Conventional P2P transactions such as that described above are relatively anonymous or semi-anonymous events; users including the requesting node 101 and the responding node 103 typically know very little about one another. Thus, it is very difficult to ascertain the trustworthiness of another user if one has had no prior dealings with the user. There is therefore a certain amount of risk involved in dealing with other network users.

Thus, there is a need in the art for a method and apparatus for establishing P2P karma and trust.

SUMMARY OF THE INVENTION

One embodiment of the present method and program for establishing peer-to-peer karma and trust by a first user in a network includes engaging in a transaction with at least a second user in the network, where the engaging includes: sending to the second user an initial transaction envelope including a first set of transaction details, wherein the initial transaction envelope is signed using a private key for the first user, receiving from the second user an appended transaction envelope, the appended transaction envelope including the first set of transaction details and a second set of transaction details, and executing the transaction in accordance with the appended transaction envelope. Feedback is exchanged with the second network user regarding the transaction, where a copy of the feedback is maintained locally by at least one of the first user and the second user. The party or parties maintaining the feedback can then provide the feedback in response to inquiries by third parties. In this manner, third parties can investigate the trustworthiness (or lack thereof) of the first and/or second user.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for establishing P2P karma and trust. Embodiments of the present invention enable users of a network to gauge the trustworthiness (or lack thereof) of other network users, based on feedback other parties have provided about the other network users. Thus, a network user can determine, before entering into a transaction (e.g., a buy/sell transaction) with another user, whether or not it is worth the risk to engage in the transaction with this relatively anonymous other user. This can aid network users in reducing the number of unsatisfactory or otherwise harmful transactions in which they participate. Moreover, the feedback is preserved in a manner that is substantially resistant to forgery or tampering, and is done without the use of a central server so that the feedback "follows" users from application to application or network to network.

Embodiments of the present invention rely on the use of public and private keys, such as those provided by a well-known Certificate Authority (e.g., the client software company or network creator).

Figure 1:
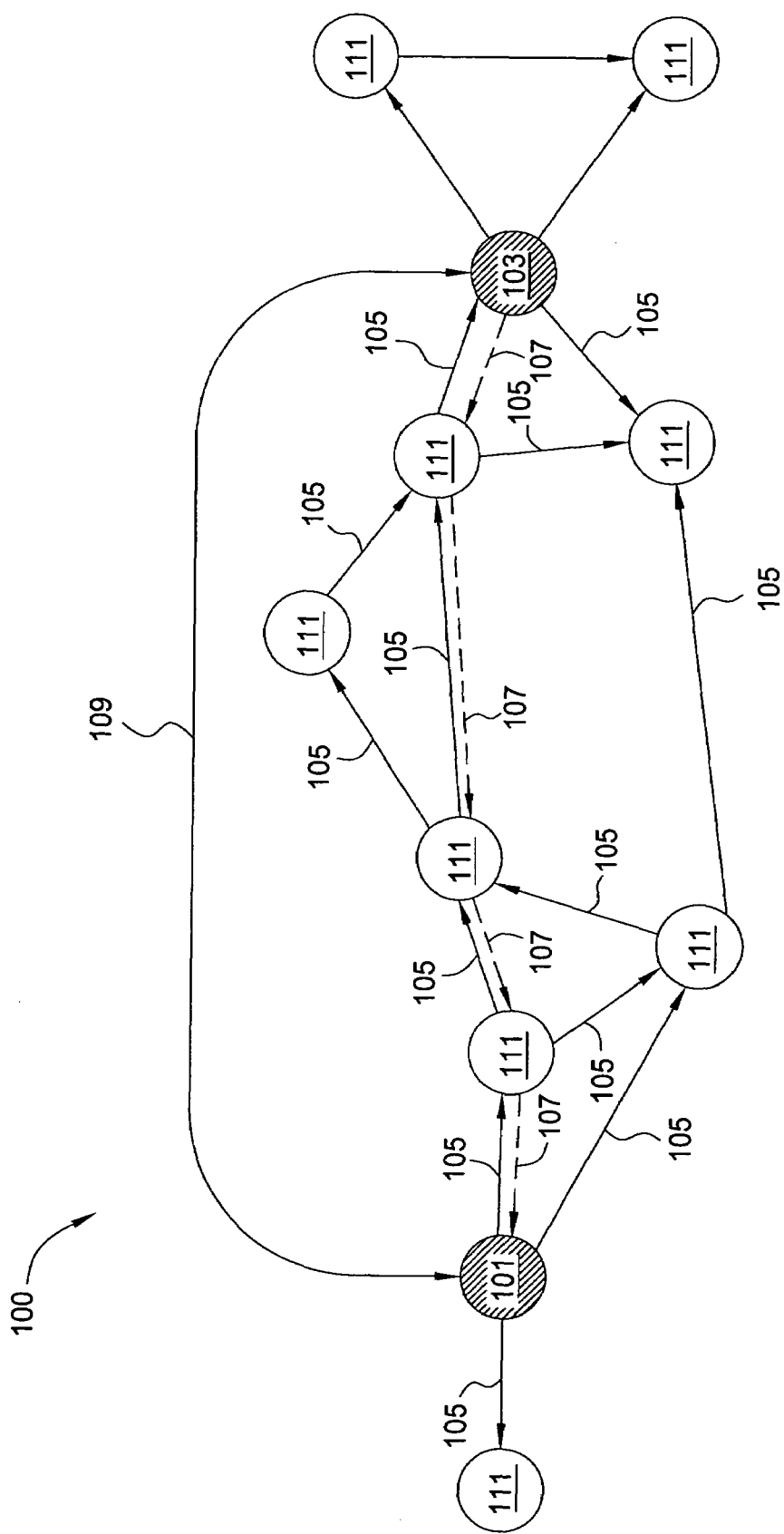
FIG. 1 is a schematic diagram of a network of nodes interacting in a peer-to-peer manner.
Figure 2:
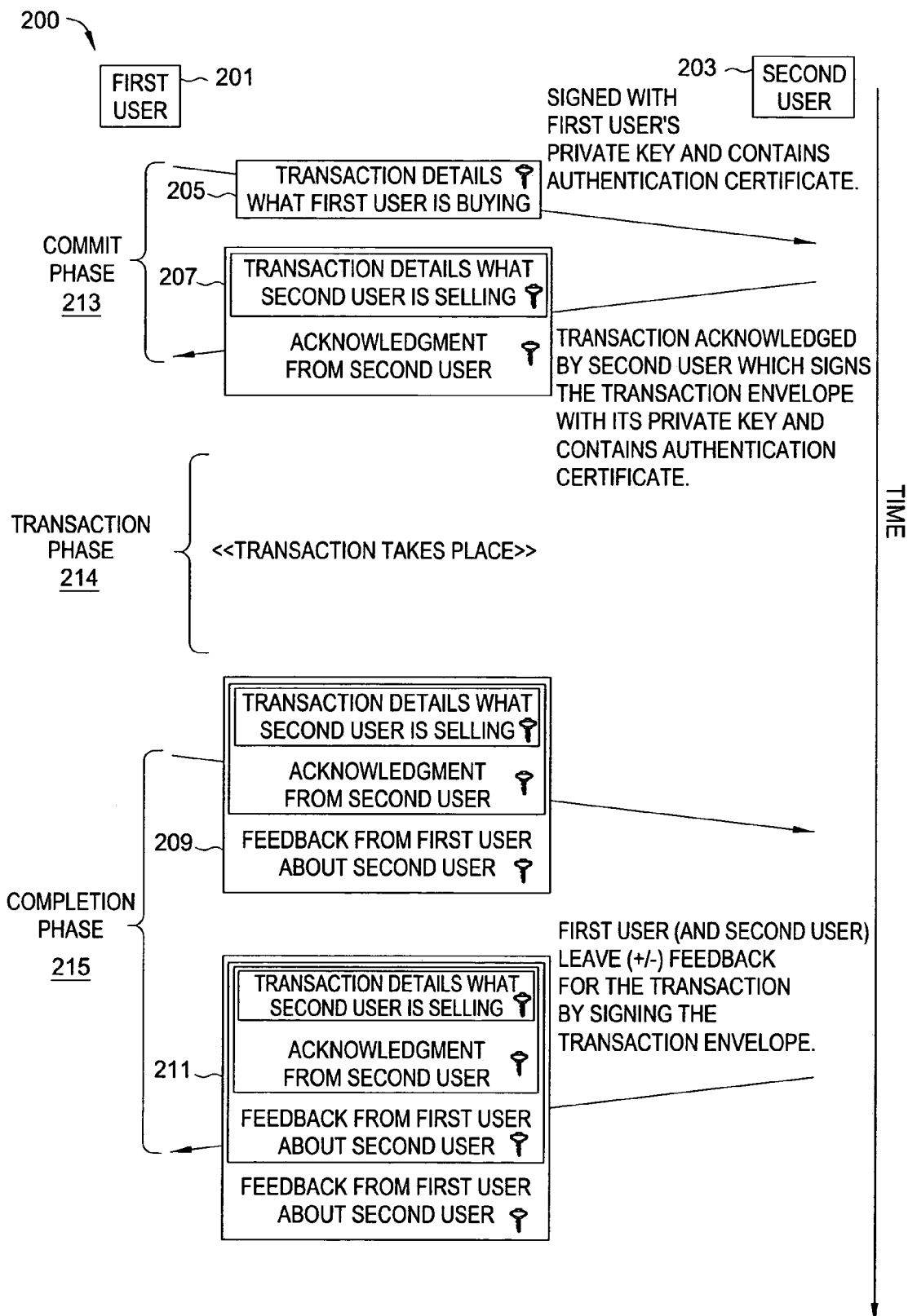
FIG. 2 is a sequence diagram illustrating one embodiment of a method for establishing karma or trust between a first user and a second user of a computing network, such as a P2P network.

FIG. 2 is a sequence diagram illustrating one embodiment of a method 200 for establishing karma or trust between a first user 201 and at least a second user 203 of a computing network, such as a P2P network. Specifically, the method 200 is presented within the exemplary context of a buy/sell transaction. In the context of a buy/sell transaction, one of the first and second users 201, 203 is the buyer, and the other is the seller.

A transaction in accordance with the method 200 includes three main phases: a commit phase 213, a transaction phase 214 and a completion phase 215. In the commit phase 213, the first user 201 and the second user 203 agree to the deals of the transaction. In the transaction phase 214, the agreed-to transaction actually occurs, either online (e.g., for digital goods or services) or offline (e.g., through the mail, for non-digital goods or services). In the completion phase 215, the first user 201 and the second user 203 leave feedback about the completed transaction.

The commit phase 213 (and the associated transaction) is initiated in step 205 when the first user 201 sends a transaction "envelope" (e.g., a message including details of the transaction, such as what the buyer is buying or what the seller is selling) to the second user 203. In one embodiment, the details included in the transaction envelope include at least one of the following: the first user's authentication certificate, the first user's public key, the first user's transaction ID, the date of the transaction, the type of transaction (e.g., tangible goods, intangible goods, money transfer, etc.), a description of the goods or services at the heart of the transaction and payment details (e.g., cost of goods or services, shipping and handling, insurance, shipping and billing addresses, etc.). The transaction envelope is signed by the first user 201 using the first user's private key. The use of the private key to sign the transaction envelope substantially ensures that the information provided by the first user 201 cannot be forged.

In step 207, the first user 201 receives an appended transaction envelope from the second user 203. The appended transaction envelope verifies the transaction details provided in the original transaction envelope sent in step 205 (e.g., using the first user's public key) and also includes additions to the transaction details provided in the original transaction envelope. Specifically, the appended transaction envelope includes details needed by the second user 203. In one embodiment, the appended transaction envelope includes at least one of the following: the second user's authentication certificate, the second user's public key and further description or requirements for the transaction. The appended transaction envelope (i.e., the entire transaction envelope including the transaction details provided by the first user 201 and the transaction details provided by the second user 203) is signed by the second user 203 using the second user's private key, thus becoming a completed transaction envelope. The use of the private key to sign the completed transaction envelope substantially ensures that the information provided by the first second user 203 cannot be forged. The first user 201 verifies the second user's additions to the completed transaction envelope using the second user's public key. In order for a user to view the entire contents of the completed transaction envelope, the first user's public key and the second user's public key are needed. The public keys may be made available through general key distribution techniques or may be attached to the transaction.

Once the completed transaction envelope has been signed by the first user 201 and the second user 203, the commit phase 213 ends. The transaction phase 214 then takes place in accordance with known online and/or offline methods, depending on the nature of the goods or services at the heart of the transaction (e.g., digital or non-digital goods or services).

Once the transaction phase 214 is completed, the completion phase 215 commences. The completion phase 215 commences when one user (e.g., the first user 201 or the second user 203) initiates the exchange of feedback with the other user(s). In the embodiment illustrated in FIG. 2, the first user 201 initiates the exchange of feedback by sending the completed transaction envelope, including feedback, to the second user 203. The feedback relates to how satisfied (or unsatisfied) the first user 201 was with the transaction (e.g., as embodied at least in the transaction phase 214). The completed transaction envelope, (i.e., the entire transaction envelope including the transaction details provided by the first user 201, the transaction details provided by the second user 203 and the first user's feedback) is signed by the first user using the first user's private key. The use of the private key to sign the completed transaction envelope substantially ensures that the feedback provided by the first user 201 cannot be forged.

In step 211, the first user 201 receives the completed transaction envelope from the second user 203, now including the second user's feedback as well. The completed transaction envelope (i.e., the entire transaction envelope including the transaction details provided by the first user 201, the transaction details provided by the second user 203, the first user's feedback and the second user's feedback) is now also signed by the second user 203 using the second user's private key, thus becoming a final transaction envelope. Thus, the second user 203 authenticates the first user's feedback in addition to providing his or her own feedback. The use of the private key to sign the final transaction envelope substantially ensures that the feedback provided by the second user 203 cannot be forged. Alternatively, the second user 203 may initiate the completion phase 215 by being the first party to provide feedback and sending the completed transaction envelope, including feedback, to the first user 201. In one embodiment feedback is not considered valid or trustworthy until the final transaction envelope is signed by both the first user 201 and the second user 203.

In this manner, feedback regarding a user's transactions and activities in a network can be preserved, without the use of a central server, for the benefit of parties that may engage in transactions with the user in the future. Thus, for example, if a third user (not shown) identifies a plurality of other users selling a product for which the third user is searching, the third user could decide which of the other users to buy the product from based, at least in part, on the previously demonstrated trustworthiness of the other users. For example, if the first user 201 is one of the plurality of users, the third user could obtain the final transaction envelope (which includes feedback) for the above-described transaction from the first user 201 and/or the second user 203. The feedback can aid the third user in determining whether or not he or she would like to go through with the transaction with the first user 201. Moreover, feedback preserved in such a manner may "follow" its associated user wherever he or she goes in the network—the feedback is thus not necessarily application- or site-specific.

In one embodiment, one or more fields of the transaction details (e.g., as provided in the commit phase 213) can be encrypted or even left blank in order to preserve the privacy of the information. Furthermore, different information fields may have different levels of security. For example, if the first user 201 does not want his or her address to appear in plain text when the final transaction envelope is provided to other users, the second user 203 may encrypt the first user's address using the first user's public key. The first user 201 can then view the information using his or her public key. When the final transaction envelope is provided to another user, the other user will be able to view at least the feedback, and perhaps some of the transaction details, but will not be able to view the first user's address.

As discussed above, the use of private keys to sign the transaction envelope at each stage where information or feedback is provided substantially ensures that the information or feedback contained therein cannot be forged. False positive feedback cannot be generated by a user, since finalized feedback requires signing (using public and private keys) by all parties involved in the transaction. In addition, false negative feedback about a user cannot be forged because the method 200 requires both users to agree to the transaction during the commit phase 213. Moreover, negative feedback can not be hidden or obscured by duplicate transaction IDs (e.g., associating a new transaction with the ID of a previously executed transaction in which negative feedback was given), because any transaction is uniquely identified by the tuple of transaction ID, first user key and second user key.

In one embodiment, where the transaction between the first user 201 and the second user 203 is completed to the satisfaction of both users (e.g., first user 201 and second user 203 both leave positive feedback), the final transaction envelope is kept by both the first user 201 and the second user 203 for future references. Thus, the first user 201 and the second user 203 may each provide the final transaction envelope as a reference to future parties with which he or she transacts (e.g., future buyers or sellers in buy/sell transactions). The positive feedback demonstrates that no problems were encountered in connection with the associated transaction and that the user providing the final transaction envelope has established some degree or level of trustworthiness.

In another embodiment, where the transaction between the first user 201 and the second user 203 is not completed to the satisfaction of both users (e.g., one or both of the first user 201 and second user 203 leave negative feedback), the final transaction envelope is kept by the user(s) leaving the negative feedback. For example, if the first user 201 was not satisfied with the transaction, the first user 201 would keep the final transaction envelope and provide the final transaction envelope to other users who seek information about the second user 203 (e.g., users potentially seeking to engage in a transaction with the second user 203). The negative feedback demonstrates that a problem was encountered in connection with the associated transaction and that the user providing the final transaction envelope has evidence of some need to exercise caution in dealing with the other user to whom the final transaction envelope is related.

In yet another embodiment, certain nodes in a network may be designated as transaction storage nodes. Transaction storage nodes maintain records of transactions (e.g., by storing final transaction envelopes), thereby allowing transaction records to be stored throughout the network in a distributed manner. Transaction storage nodes may be dedicated nodes that exist specifically to store transaction records, or they may be user nodes that perform the additional task of storing transaction records. In one embodiment, network users provide a transaction storage node with copies of final transaction envelopes, so that the transaction storage node may provide the final transaction envelopes to other users seeking feedback about certain other users. Transaction storage nodes may be advantageously deployed in transient networks such as P2P networks, where all users are not available at all times.

In another embodiment still, feedback can be updated, e.g., to resolve any issues that may have led to the provision of negative feedback. In one embodiment, the number of times that feedback may be updated for a single transaction is capped at a fixed amount. In one embodiment, the fixed amount is large enough to allow users to resolve any issues that may have led to the provision of negative feedback, but small enough to ensure that the users do not continue to leave feedback or to feud indefinitely.

Figure 3:
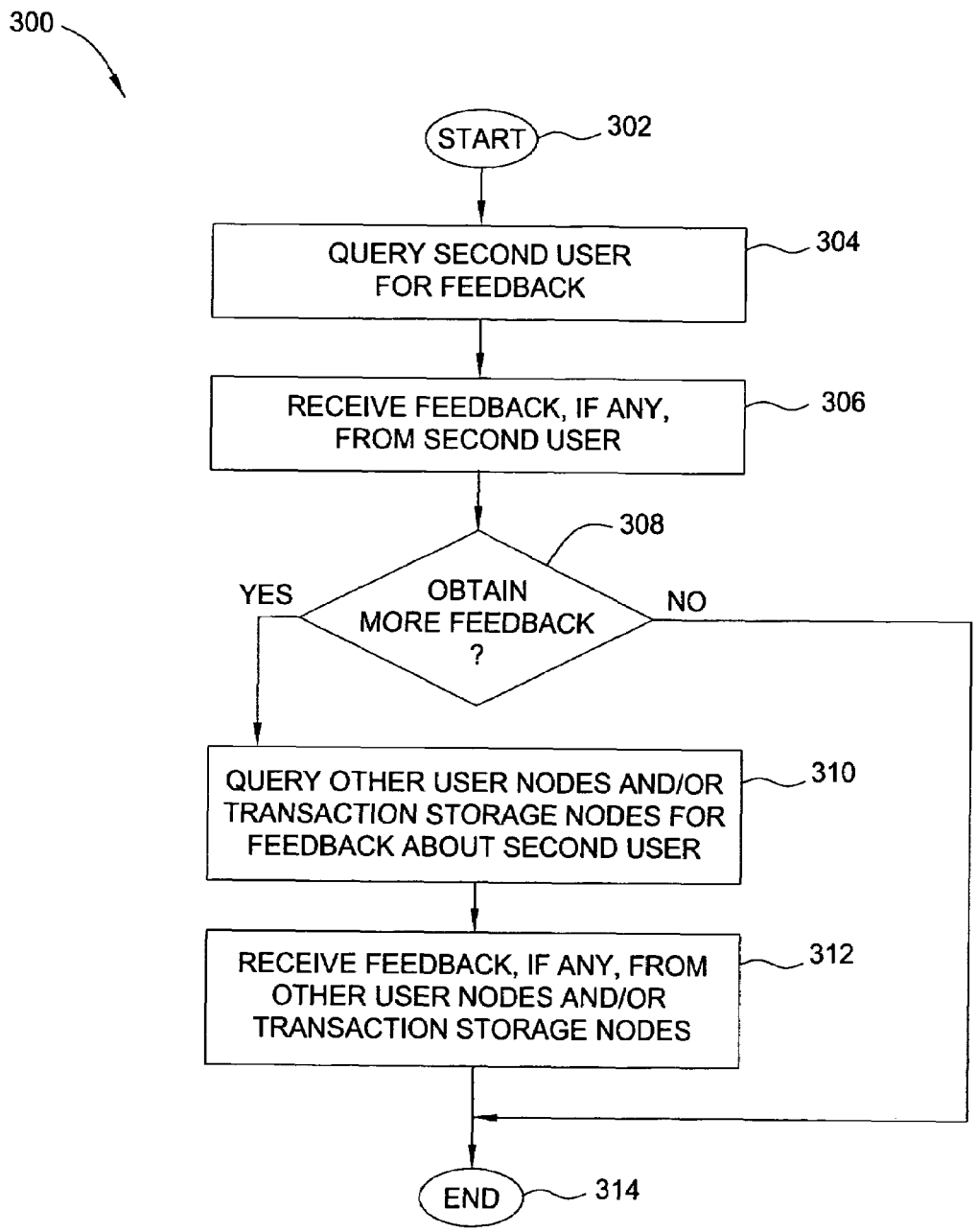
FIG. 3 is a flow diagram illustrating one embodiment of a method for assessing feedback, according to the present invention.

FIG. 3 is a flow diagram illustrating one embodiment of a method 300 for obtaining feedback, according to the present invention. The method 300 may be implemented, for example, when a first user is considering engaging in a transaction with a second user and wishes to first determine the second user's trustworthiness.

The method 300 is initialized at step 301 and proceeds to step 303, where the method 300 directly queries the second user for feedback about the second user (e.g., final transaction envelopes that the second user has saved from previous transactions). In step 306, the method 300 receives the requested feedback from the second user, if the second user has any feedback to provide. In one embodiment, where a user keeps only final transaction envelopes that reflect positively on him or her, the method 300 thus receives from the second user zero or more pieces of positive feedback in step 306.

In step 308, the method 300 determines whether or not it is necessary to obtain more feedback about the second user (e.g., from other sources). In one embodiment, the amount of feedback needed to make a decision about another user is adjustable and/or user-definable based on user preferences (e.g., "n pieces of feedback are required to make a decision"). If the method 300 determines in step 308 that it has all of the feedback about the second user that it desires or requires, then the method 300 terminates in step 314.

Alternatively, if the method 300 determines in step 308 that more feedback about the second user should be obtained, the method 300 proceeds to step 310 and queries other user nodes and/or transaction storage nodes for feedback about the second user. The method 300 then receives feedback about the second user from other user nodes and/or transaction nodes in step 312, if any such feedback exists. The method 300 thus receives from the other user nodes and/or transaction storage nodes zero or more pieces of positive feedback and zero or more pieces of negative feedback in step 312. The method 300 then terminates in step 314.

Figure 4:
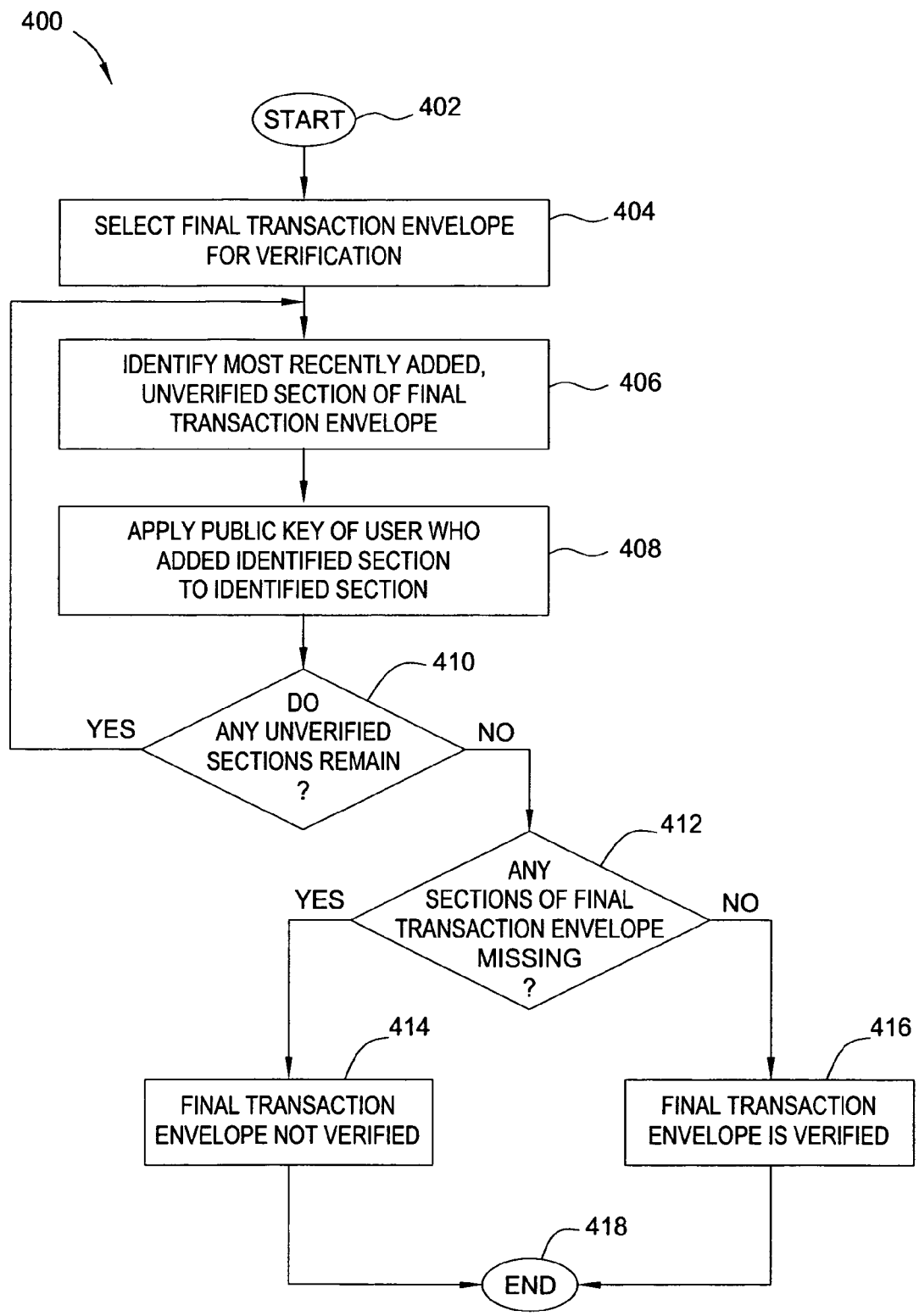
FIG. 4 is a flow diagram illustrating one embodiment of a method for assessing feedback, according to the present invention.

FIG. 4 is a flow diagram illustrating one embodiment of a method 400 for assessing feedback, according to the present invention. Specifically, the method 400 is a method for verifying the contents of a final transaction envelope. The method 400 may be implemented, for example, after a first user has obtained feedback (in the form of one or more final transaction envelopes) about a second user (e.g., from the second user or one or more other users).

The method 400 is initialized at step 402 and proceeds to step 404, where the method 400 selects a final transaction envelope (e.g., received in accordance with the method 300) for verification. The selected final transaction envelope contains information about a previous transaction in which the second user was involved.

In step 406, the method 400 identifies the most recently added, unverified section of the selected final transaction envelope. By unverified, it is meant that the first user has not yet reviewed the contents of the section.

In step 408, the method 400 applies the public key of the user who added the identified section (i.e., the most recently added, unverified section) to the identified section, in order to "open" the identified section so that its contents may be viewed.

In step 410, the method 400 determines whether any unverified sections of the final transaction envelope remain. If the method 400 concludes in step 410 that at least one unverified section remains, the method 400 returns to step 406 and proceeds as described above in order to open the most recently added, unverified section of the final transaction envelope. Thus, the method 400 opens the sections of the final transaction envelope starting with the last section (i.e., the most recently added section) and working backward toward the first section, applying at each step the public key of the user who added the associated section.

Alternatively, if the method 400 concludes in step 410 that no unverified sections of the final transaction envelope remain (i.e., all sections have been verified), the method 400 proceeds to step 412 and determines whether any sections of the final transaction envelope appear to be missing. At this stage, if all sections of the final transaction envelope have been verified by applying the appropriate user's public key, it can be determined whether the final transaction envelope is "complete" in the sense that the final transaction envelope contains all of the expected information.

If the method 400 determines in step 412 that the final transaction envelope is missing one or more sections, the method 400 concludes in step 414 that the final transaction envelope is not verified. Alternatively, if the method determines in step 412 that the final transaction envelope is not missing any sections, the method 400 concludes in step 416 that the final transaction envelope is verified. The method 400 then terminates in step 418.

Figure 5:
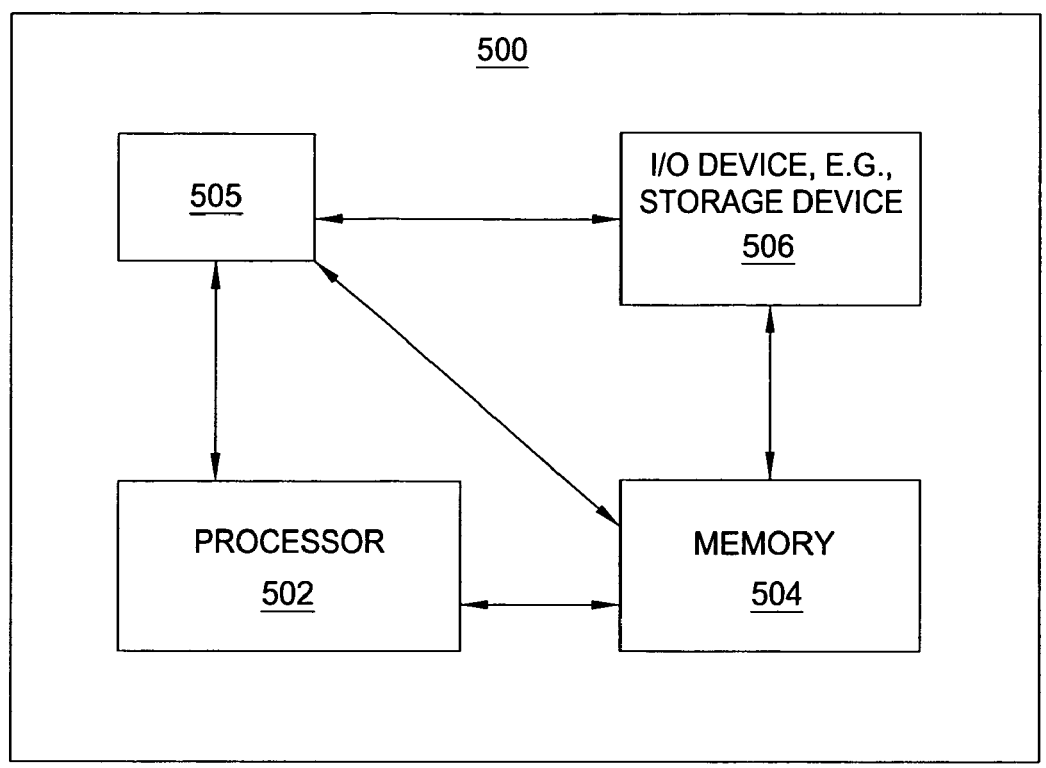
FIG. 5 is a high level block diagram of the trust establishment method that is implemented using a general purpose computing device.

FIG. 5 is a high level block diagram of the trust establishment method that is implemented using a general purpose computing device 500. In one embodiment, a general purpose computing device 500 comprises a processor 502, a memory 504, a trust establishment module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the trust establishment module 505 can be implemented as a physical device or subsystem that is coupled to a processor through a communication channel.

Alternatively, the trust establishment module 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the trust establishment module 505 for establishing trust or karma in a computing network described herein with reference to the preceding Figures can be stored on a computer readable medium or carrier (e.g., RAM, magnetic or optical drive or diskette, and the like).

Thus, the present invention represents a significant advancement in the field of computing networks. A method and apparatus are provided that make it possible for users of a network to gauge the trustworthiness (or lack thereof) of other network users, based on feedback other parties have provided about the other network users. Thus, a network user can determine, before entering into a transaction (e.g., a buy/sell transaction) with another user, whether or not it is worth the risk to engage in the transaction with this relatively anonymous other user. This can aid network users in reducing the number of unsatisfactory or otherwise harmful transactions in which they participate. Moreover, the feedback is preserved in a manner that is substantially resistant to forgery or tampering, and is done without the use of a central server.

While the foregoing is directed to the preferred embodiment of the present invention, other and further embodiments of the invention may be devised without departing from the basic scope thereof, and the scope thereof is determined by the claims that follow.

The invention claimed is:

1. A method for establishing user trustworthiness by a first user in a network, said method comprising:
engaging in a transaction with at least a second user in said network, wherein said engaging comprises:
sending to said second user an initial transaction envelope including a first set of transaction details, wherein said initial transaction envelope is signed using a private key for said first user;
receiving from said second user an appended transaction envelope, said appended transaction envelope including said first set of transaction details and a second set of transaction details; and
executing said transaction in accordance with said appended transaction envelope; and
exchanging feedback with second user regarding said transaction, a copy of said feedback being maintained locally at least one of: said first user or said second user.

2. A method for establishing user trustworthiness by a first user in a network, said method comprising:
engaging in a transaction with at least a second user in said network, wherein said enqaging comprises:
sending to said second user a initial transaction envelope including a first set of transaction details;
receiving from said second user an appended transaction envelope, said appended transaction envelope including said first set of transaction details and a second set of transaction details, wherein said appended transaction envelope is signed using a private key for said second user; and
executing said transaction in accordance with said appended transaction envelope; and
exchanging feedback with said second user regarding said transaction, a copy of said feedback being maintained locally by at least one of: said first user or said second user.

3. A method for establishing user trustworthiness by a first user in a network, said method comprising:
engaging in a transaction with at least a second user in said network, wherein said engaging comprises:
sending to said second user en initial transaction envelope including a first set of transaction details;
receiving from said second user an appended transaction envelope, said appended transaction envelope including said first set of transaction details and a set of transaction details; and
executing said transaction in accordance with said appended transaction envelope; and
exchanging feedback with said second user recording said transaction, a copy of said feedback being maintained locally by at least one of: said first user or said second user, wherein said exchanging comprises:
sending to said second user a completed transaction envelope, said completed transaction envelope including said first set of transaction details, said second set of transaction details and said feedback from said first user regarding said transaction, wherein said completed transaction envelope is signed using a private key for said first user; and
receiving from said second user a final transaction envelope, said final transaction envelope including said first set of transaction details, said second set of transaction details, said feedback from said first user and said feedback from said second user regarding said transaction.

4. A method for establishing user trustworthiness by a first user in a network, said method comprising:
engaging in a transaction with at least a second user in said network, wherein said engaging comprises:
sending to said second user an initial transaction envelope including a first set of transaction details;
receiving from said second user an appended transaction envelope, said appended transaction envelope including said first set of transaction details and a second set of transaction details; and
executing said transaction in accordance with said appended transaction envelope; and
exchanging feedback with said second user regarding said transaction, a copy of said feedback being maintained totally by at least one of: said first user or said second user wherein said exchanging comprises:
  sending to said second user a completed transaction envelope, said completed transaction envelope including said first set of transaction details, said second set of transaction details d said feedback from said first user regarding said transaction; and
  receiving from said second user final transaction envelope, said final transaction envelope including said first se transaction details, said second set of transaction details, said feedback from said first user and said feedback from said second user regarding said transaction, wherein said final transaction envelope is signed using a private key for said second user.

5. A computer readable medium containing an executable program for establishing user trustworthiness by a first user in a network, where the program performs the steps of:
  engaging in a transaction with at least a second user in said network, wherein said engaging comprises:
    sending to said second user an initial transaction envelope including a first set of transaction details, wherein said initial transaction envelope is signed using a private key for said first user;
    receiving from said second user an appended transaction envelope, said appended transaction envelope including said first set of transaction details and a second set of transaction details; and
    executing said transaction in accordance with said appended transaction envelope; and
  exchanging feedback with said second user regarding said transaction, a copy of said feedback being maintained locally by at least one of: said first user or said second user.

6. A computer readable medium containing an executable program for establishing user trustworthiness by a first user in a network, where the program performs the steps of:
  engaging in a transaction with at least a second user in said network, wherein said engaging comprises:
    sending to said second user an initial transaction envelope including a first sat of transaction details;
    receiving from said second user an appended transaction envelope, said appended transaction envelope including said first set of transaction details and a second set of transaction details, wherein said appended transaction envelope is signed using a private key for said second user; and
    executing said transaction in accordance with said appended transaction envelop; and
  exchanging feedback with said second user regarding said transaction, a copy of said feedback being maintained locally by at least one of: said first user or said second user.

7. A computer readable medium containing an executable program for establishing user trustworthiness by a first user in a network, where the program performs the steps of:
  engaging in a transaction with at least a second user in said network, wherein said engaging comprises:
    sending to said second user an initial transaction envelope including a first set of transaction details;
    receiving from said second user an appended transaction envelope, said appended transaction envelope including said first set of transaction details and a second set of transaction details; and
    executing said transaction in accordance with said appended transaction envelope; and
  exchanging feedback with said second user regarding said transaction, a copy of said feedback being maintained locally by at least one of: said first user or said second user, wherein said exchanging comprises:
    sending to said second user a completed transaction envelope, said completed transaction envelope including said first set of transaction details, said second set of transaction details and said feedback from said first user regarding said transaction, wherein said completed transaction envelope is signed using a private key for said first user; and
    receiving from said second user a final transaction envelope, said final transaction envelope including said first set of transaction details, said second set of transaction details, said feedback from said first user and said feedback from said second user regarding said transaction.

8. A computer readable medium containing an executable program for establishing user trustworthiness by a first user in a network, where the program performs the steps of:
  engaging in a transaction with at least a second user in said network, wherein said engaging comprises:
    sending to said second user an initial transaction envelope including a first set of transaction details;
    receiving from said second user an appended transaction envelope, said appended transaction envelope including said first set of transaction details and a second set of transaction details; and
    executing said transaction in accordance with said appended transaction envelope; and
  exchanging feedback with said second user regarding said transaction, a copy of said feedback being maintained locally by at least one of: said first user or said second user, wherein said exchanging comprises:
    sending to said second user a completed transaction envelope, said completed transaction envelope including said first set of transaction details, said second set of transaction details and said feedback from said first user regarding said transaction; and
    receiving from said second user a final transaction envelope, said final transaction envelope including said first set of transaction details, said second set of transaction details, said feedback from said first user and said feedback from said second user regarding said transaction, wherein said final transaction envelope is signed using a private key for said second user.

* * * * *